United States Patent
Chan et al.

(10) Patent No.: US 11,061,420 B2
(45) Date of Patent: Jul. 13, 2021

(54) MOUNTING MECHANISM FOR THERMOSTATIC DEVICES

(71) Applicant: Computime Ltd., New Territories (HK)

(72) Inventors: Dick Kwai Chan, Hong Kong (CN); Ben Ren Tan, Shenzhen (CN)

(73) Assignee: Computime Ltd., New Territories (HK)

( * ) Notice: Subject to any disclaimer, the term of this patent is extended or adjusted under 35 U.S.C. 154(b) by 148 days.

(21) Appl. No.: 16/371,676

(22) Filed: Apr. 1, 2019

(65) Prior Publication Data

US 2020/0310474 A1  Oct. 1, 2020

(51) Int. Cl.

| | |
|---|---|
| *G05D 23/185* | (2006.01) |
| *B21D 53/02* | (2006.01) |
| *B23P 19/04* | (2006.01) |
| *F24D 19/10* | (2006.01) |

(52) U.S. Cl.
CPC ......... *G05D 23/1852* (2013.01); *B21D 53/02* (2013.01); *B23P 19/04* (2013.01); *F24D 19/1018* (2013.01)

(58) Field of Classification Search
CPC . G05D 23/1852; F24D 19/1018; F16L 37/22; F16L 37/23; F16L 37/26; B21D 53/02; B24P 19/04; B23P 19/04
See application file for complete search history.

(56) References Cited

U.S. PATENT DOCUMENTS

| | | | | |
|---|---|---|---|---|
| 2,548,528 A | * | 4/1951 | Hansen | F16L 37/23 |
| | | | | 251/149.6 |
| 3,196,897 A | * | 7/1965 | Hodson | F16L 37/32 |
| | | | | 137/312 |
| 4,653,573 A | * | 3/1987 | Hansen | F24D 19/0002 |
| | | | | 137/563 |
| 9,909,703 B2 | * | 3/2018 | Van Scyoc | F16L 37/23 |
| 2008/0012314 A1 | * | 1/2008 | Harger | F16L 37/0985 |
| | | | | 285/308 |

* cited by examiner

*Primary Examiner* — Marc E Norman
(74) *Attorney, Agent, or Firm* — Banner & Witcoff, Ltd.

(57) ABSTRACT

A mounting device facilitates connecting an Internet of Things (IoT) device, such as thermostatic radiator valve (TRV) and automatic temperature balanced actuator (ABA), to a hydronic heating/cooling system to control the temperature of a room by changing the flow of hot/cold water through radiator. The mounting devices includes a male section and a female section, which is attached to the IoT device. The mounting device may be installed in two stages. First, a male section is attached to a component of the hydronic heating/cooling system (for example, a valve or manifold) by threading the male section onto the component. Second, a female section, is positioned to male section and locked into place by releasing a sliding sleeve. The female section (with the IoT device) may be easily removed by retracting the sliding sleeve.

17 Claims, 7 Drawing Sheets

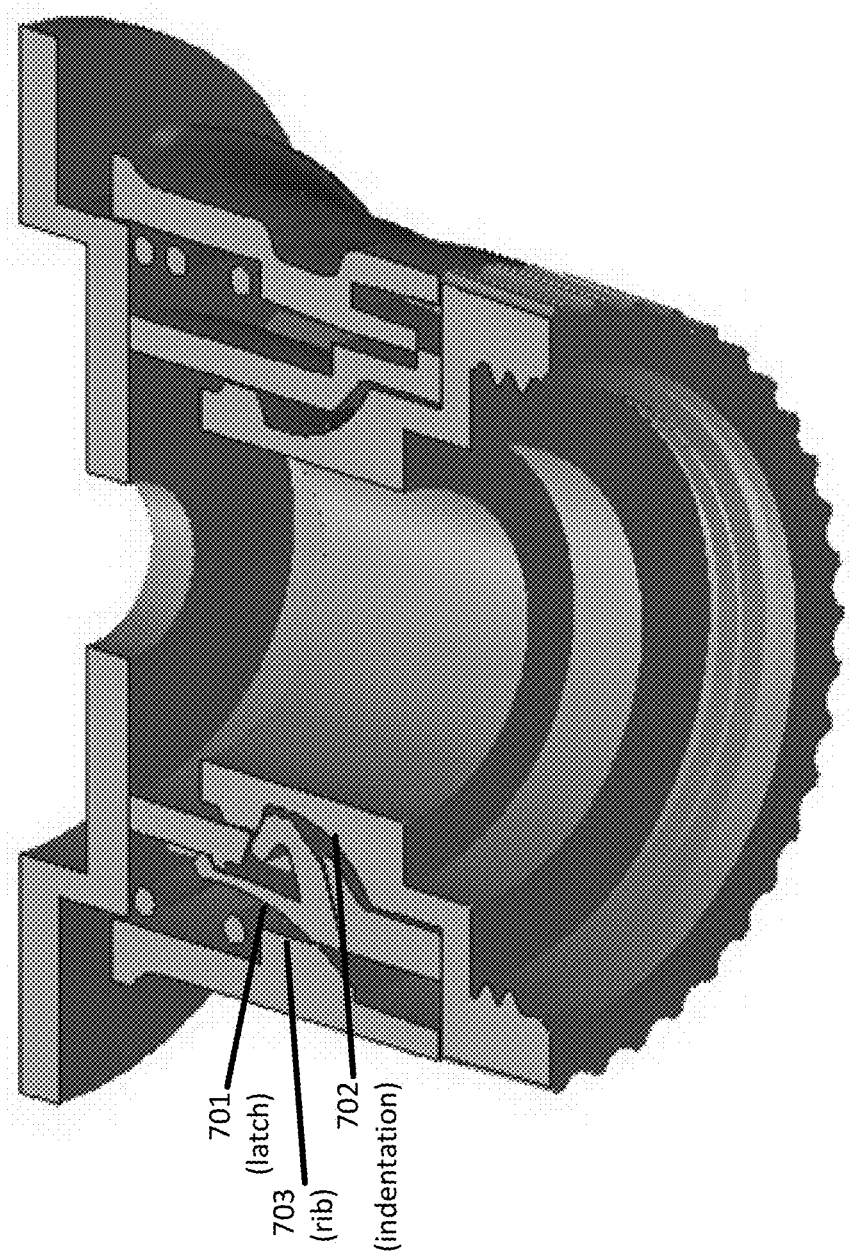

MOUNTING MECHANISM FOR THERMOSTATIC DEVICES

TECHNICAL FIELD

Aspects of the disclosure relate to a mounting mechanism for thermostatic devices such as a thermostatic radiator valve (TRV) and an automatic temperature balanced actuator (ABA).

BACKGROUND

Internet of Things (IoT) applications are growing rapidly, and the demands on IoT control devices are increasing as well. Consequently, facilitating the installation of IoT control devices is important.

BRIEF DESCRIPTION OF THE DRAWINGS

The present disclosure is illustrated by way of example and not limited in the accompanying figures in which like reference numerals indicate similar elements and in which:

FIG. 7 shows a sectional view of a mounting mechanism in a locked state according to one or more aspects of the present disclosure.

SUMMARY OF INVENTION

Figure 1:
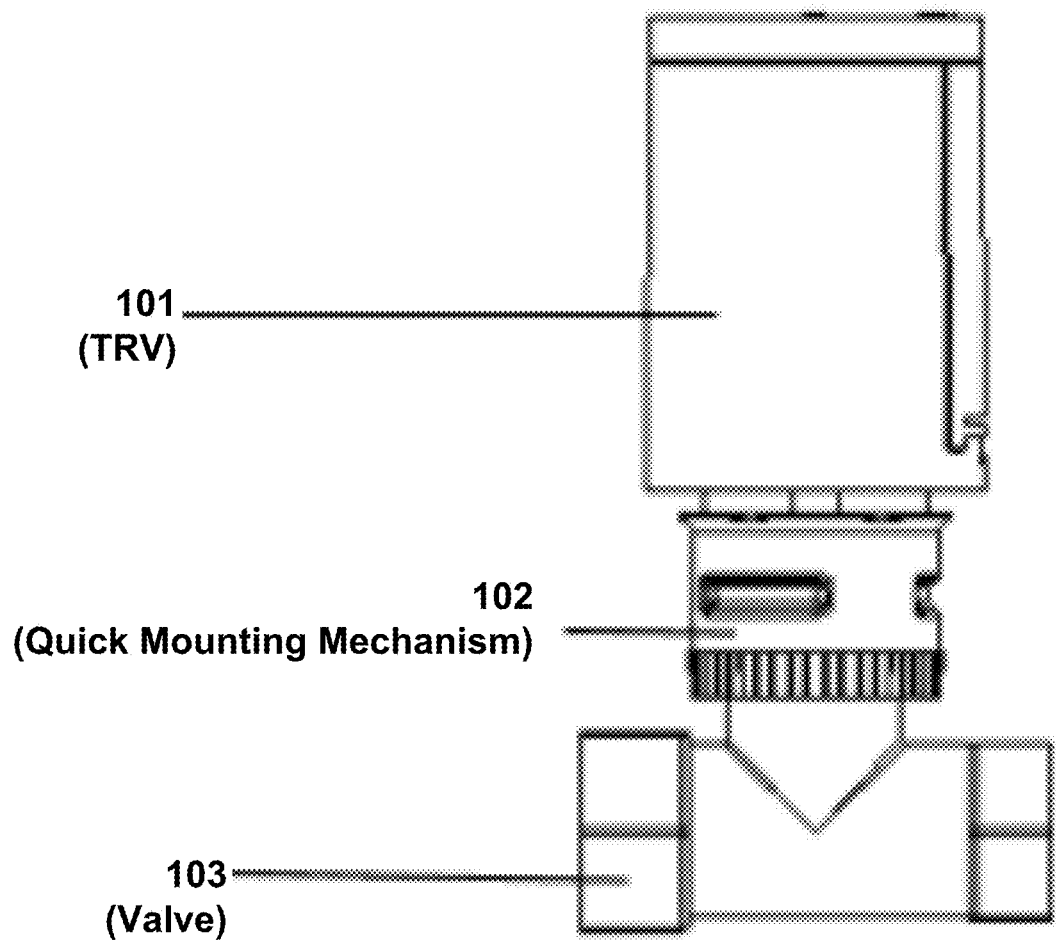
FIG. 1 shows a mounting mechanism for a thermostatic radiator valve (TRV) and a valve connection according to one or more aspects of the present disclosure.

The following presents a simplified summary of various aspects described herein.

This summary is not an extensive overview, and is not intended to identify key or critical elements or to delineate the scope of the claims. The following summary merely presents some concepts in a simplified form as an introductory prelude to the more detailed description provided below.

In one embodiment, in accordance with aspects of the disclosure, a quick connect-disconnect coupling mechanism comprises a male section (portion) and a female section (portion).

With another aspect, a male section comprises a single adaptor having a lower end with threads and an upper end with a flange. The adapter may be constructed from a polymer and/or metallic materials.

With another aspect, a male section may have threads with a different size and different type to engage the threading of a valve or manifold of a hydronic heating system.

With another aspect, a male section may have a flange that is designed to engage latches of corresponding female section.

With another aspect, a female section comprises a main body; a slide sleeve, one or more latches, and a metal spring. Components of the female section may be constructed from a polymer and/or metallic materials.

With another aspect, a female section may include a main body that can mount to a valve controller by using screws, glue, or welding.

With another aspect, a female section may include main body that can be embedded to a body of a valve controller.

With another aspect, a female section may have a slide sleeve that is movable relative to the main body and that stops the latches from moving in a release state.

With another aspect, a female section may have a spring that always push down the slide sleeve when the slide sleeve is in a release state.

With another aspect, a female section may have one or more than one latches that engages a flange of a corresponding male section.

With another aspect, a mounting device facilitates connecting an Internet of Things (IoT) device such as thermostatic radiator valve (TRV) and automatic temperature balanced actuator (ABA) to a hydronic heating system to control the temperature of a room by changing the flow of hot water through radiator. The mounting devices includes a male section and a female section, which is attached to the IoT device. The mounting device may be installed in two stages. First, a male section is attached to a component of the hydronic heating system (for example, a valve or manifold) by threading the male section onto the component. Second, a female section, is positioned to male section and locked into place by releasing a sliding sleeve. The female section (with the IoT device) may be easily removed by pushing the sliding sleeve upward to retract it.

With another aspect, a mounting device facilitates connecting a IoT device such as thermostatic radiator valve (TRV) and automatic temperature balanced actuator (ABA) to a hydronic cooling system to control the temperature of a room by changing the flow of cold water through radiator.

With another aspect, a male section of a mounting device includes a flange and an indentation around the male section below and along the flange. The male section has a threaded lower end that is attached to a component of the hydronic heating system by threading the threaded lower end onto the component. The female section is inserted to the male section and attached to the male section by the latching mechanism locking onto the indentation of the male section in a lock state when the slide sleeve is in a lower position along a main body of the female section. The latching mechanism is released from the indentation of the male section when the slide sleeve is in an upper position along the main body.

With another aspect, a female section includes a retention mechanism that maintains a mounting device in the lock state by generating a downward force on the latching mechanism. The retention mechanism may comprise a spring located between a main body and a slide sleeve of the female section.

With another aspect, a slide sleeve of a female section may have at least one rib that holds a latch mechanism in place when the slide sleeve is in a lower position along a main body of the female section.

With another aspect, a latching mechanism of a female section comprises one or more latches. The one or more latches locks into an indentation of a corresponding male section.

With another aspect, a thermostatic device is attached to an upper part of a female section. The thermostatic device may be embedded with, glued or welded to, or attached with one or more screws or latches to a bottom of the thermostatic device.

With another aspect, a mounting device may be implemented with a reverse design, where a female section is connected to a component of a hydronic heating system and a male section, which is attached to a IoT device, is locked to the female section.

These and additional aspects will be appreciated with the benefit of the disclosures discussed in further detail below.

DETAILED DESCRIPTION

FIG. 1 shows mounting mechanism 102 for coupling a thermostatic device such as thermostatic radiator valve (TRV) 101 to valve connection 103 in accordance with one or more aspects of the present disclosure.

With traditional approaches, installation of a valve controller (for example, a TRV or an automatic temperature balanced actuator (ABA)) to a hydronic heating/cooling system may be difficult and time consuming With some traditional approaches, the valve controller is mounted to the hydronic heating/cooling system using a mounting ring, which may be constructed from metal or plastic. An installer must often use one hand to hold the controller body while aligning it to the valve or manifold and then to tighten the mounting ring with the other hand or with tools. The location of valves and manifolds may be very close to the wall or in areas that are difficult to be accessed by hand, thus making the installation very difficult, time consuming, and costly.

Figure 2:
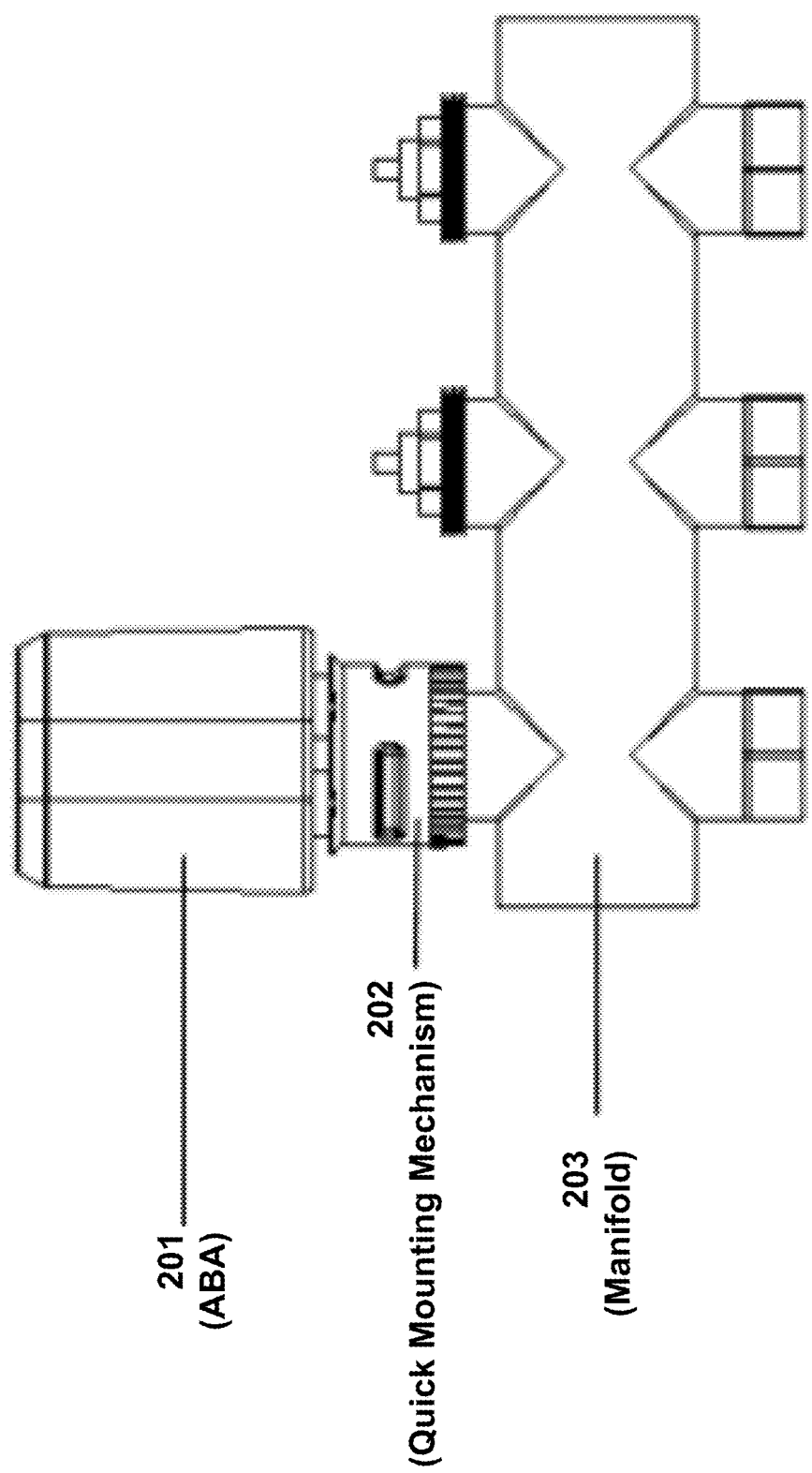
FIG. 2 shows a mounting mechanism for an automatic temperature balanced actuator (ABA) and a valve connection according to one or more aspects of the present disclosure.

Referring to FIGS. 1 and 2, mounting device 102 and mounting device 202 are adapted for connecting an Internet of Things (IoT) device such TRV 101 or ABA 201 to valve 103 or manifold 203, respectively, of a hydronic heating/cooling system. Devices 101 and 201 may control the temperature of a room by changing the flow of hot/cold water through a radiator.

Embodiments may support other types of IoT devices with a water flow sensor including a water flow controller, an in-line shutoff valve/actuator, an in-line metering valve/actuator, and so forth. For example, an IoT device can turn off a valve/manifold of a heating/cooling system when a pipe bursts.

IoT devices are often computing devices that connect wirelessly to a network and have the ability to transmit data. IoT devices utilize internet connectivity for remote monitoring and controlling.

With an aspect of the embodiments, mounting devices 102 and 202 enable IoT devices, such as TRV 101 and ABA 201, to be connected/disconnected securely and without tools to a hydronic heating/cooling system (for example, to/from valve 103 and manifold 203, respectively) in order to control the temperature of a room by changing the flow of hot/cold water through a radiator.

Figure 3:
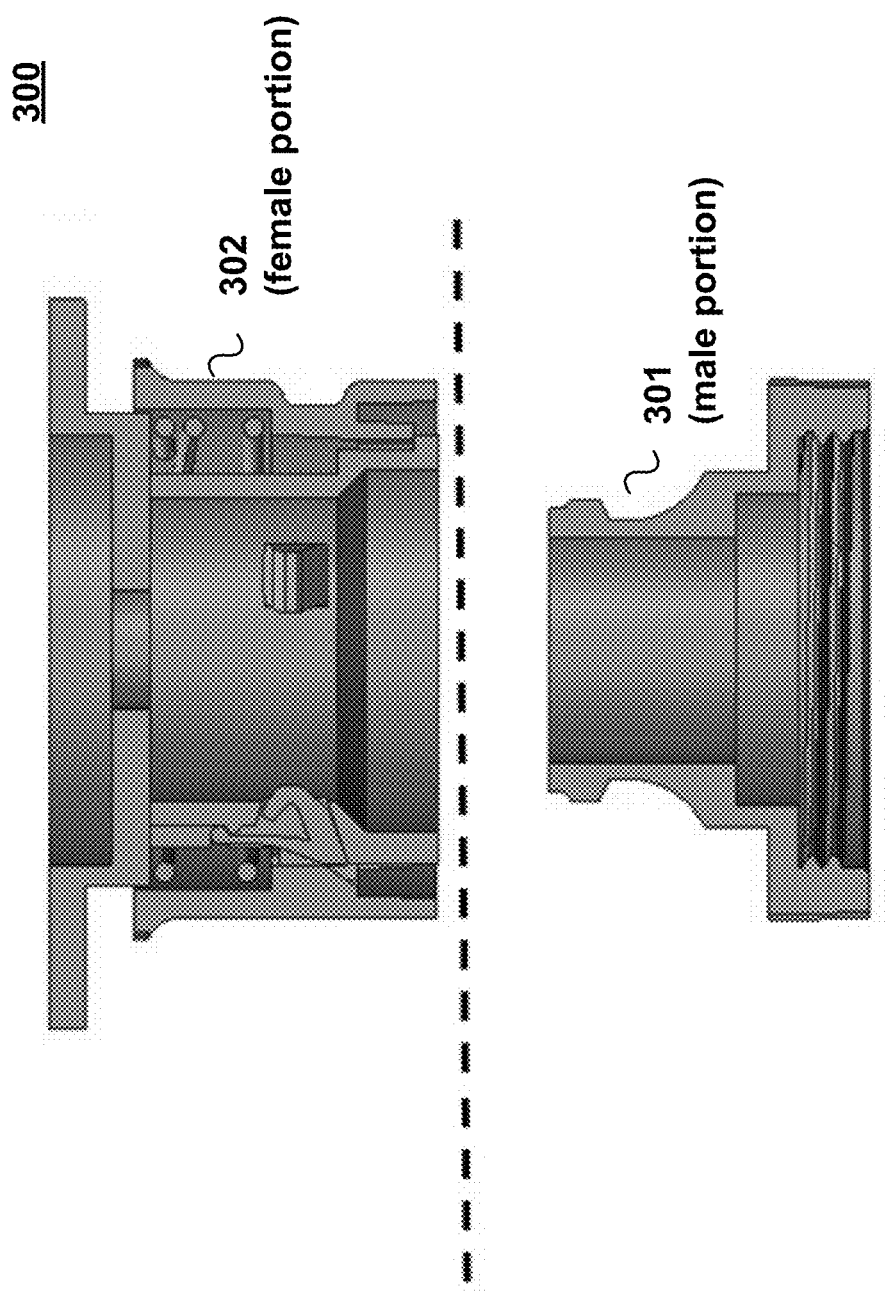
FIG. 3 shows a mounting mechanism according to one or more aspects of the present disclosure.

FIG. 3 shows mounting mechanism 300 according to one or more aspects of the present disclosure. Mounting mechanism 300 comprises male portion 301 and female portion 302, where an IoT device to b attached to female portion 302 as will discussed. Installation of the IoT device typically occurs in two stages. First, only male portion 301 is attached to a component of a hydronic heating/cooling system (for example, a valve or manifold) by threading it onto the component. Second, female portion 302 is attached to male portion 301 using a quick mounting mechanism as will be discussed.

A IoT device (not explicitly shown) may be attached to female portion 302 by latches, screws, gluing, welding, or embedding the female portion 302 to the bottom of the IoT device.

Figure 4:
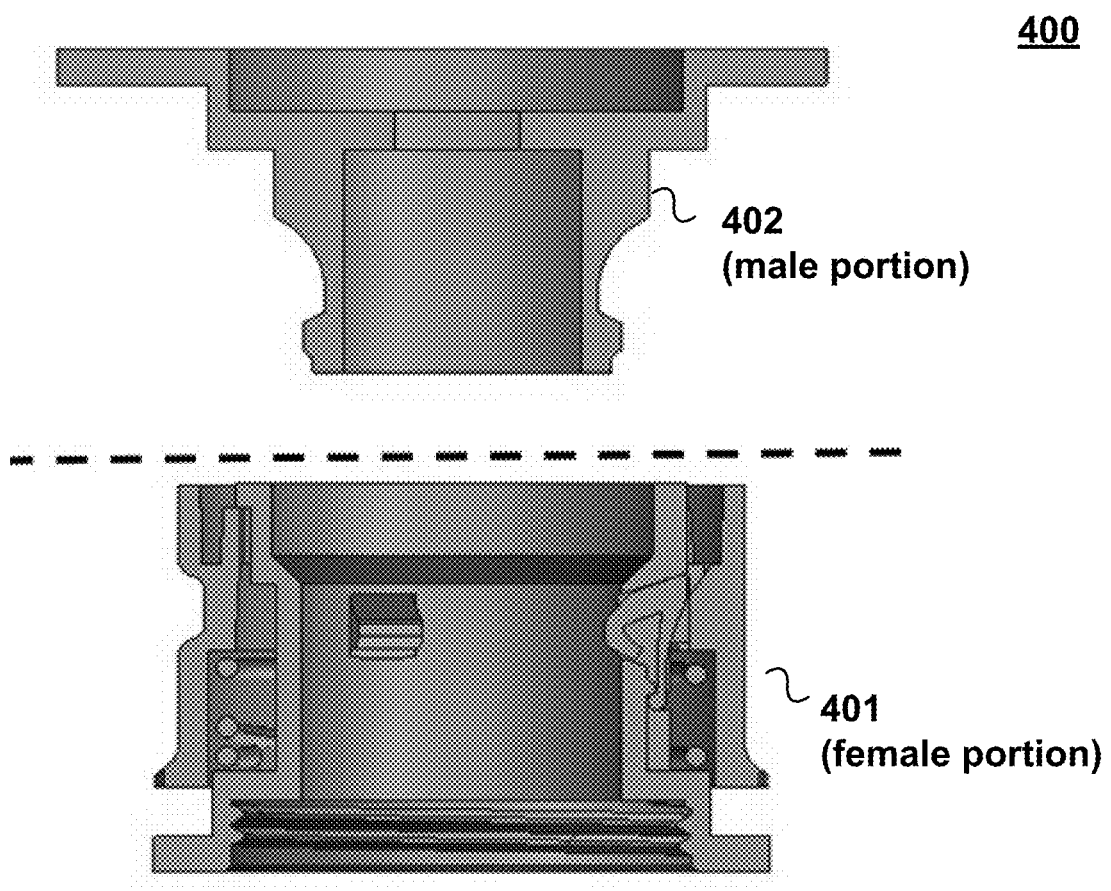
FIG. 4 shows a mounting mechanism according to one or more aspects of the present disclosure.

FIG. 4 shows mounting mechanism 400 according to one or more aspects of the present disclosure. Mounting mechanism 400 comprises female portion 401 and male portion 402, where an IoT device to b attached to male portion 402 as will discussed. Installation of the IoT device occurs in two stages. First, only female portion 401 is attached to a component of a hydronic heating/cooling system (for example, a valve or manifold) by threading onto the component. Second, male portion 402 is attached to female section 401 using a quick mounting mechanism as will be discussed.

A IoT device (not explicitly shown) may be attached to male portion 402 by latches, screws, gluing, welding, or embedding male portion 402 to the bottom of the IoT device.

Figure 5:
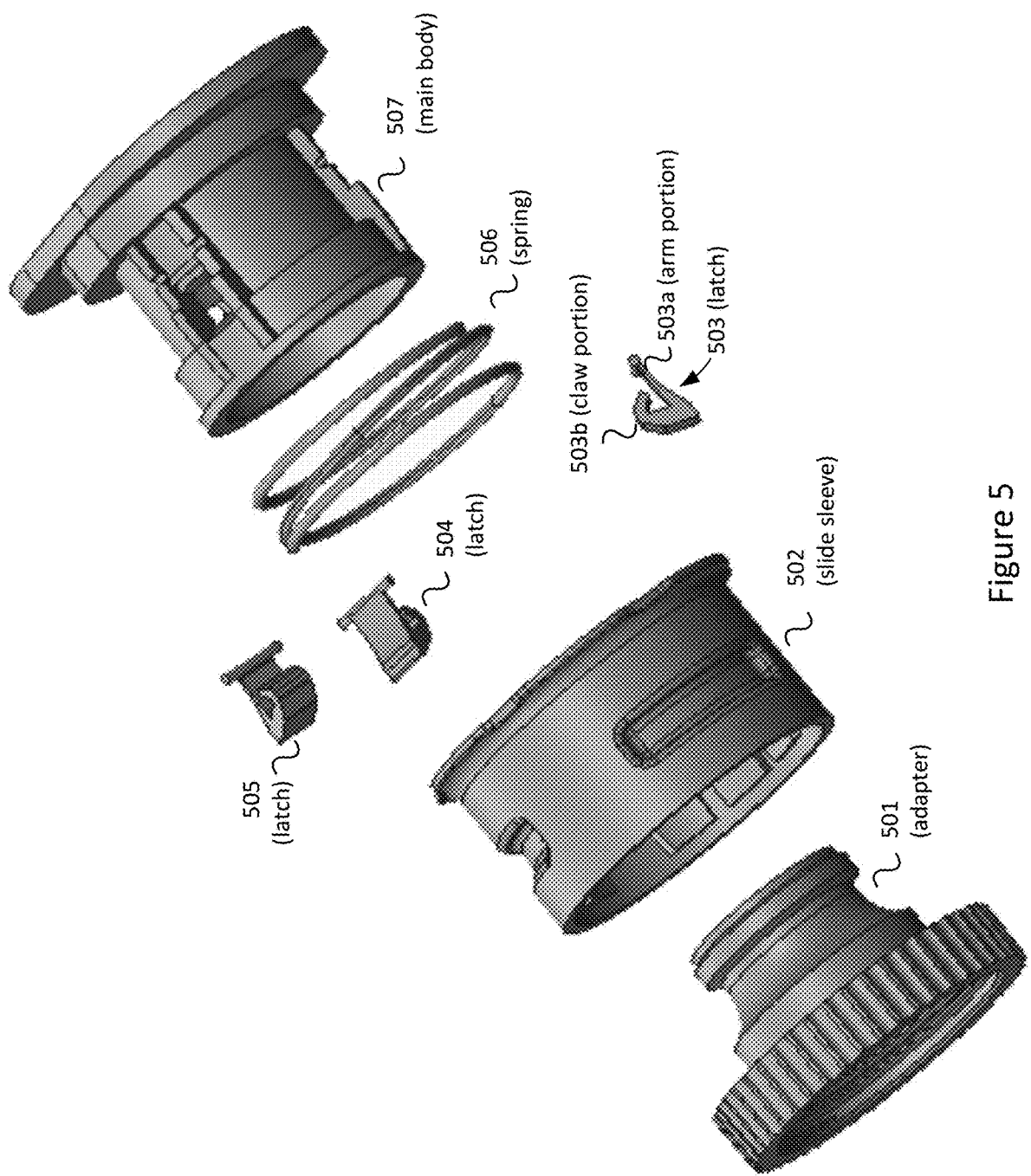
FIG. 5 shows a perspective view of a mounting mechanism according to one or more aspects of the present disclosure.

FIG. 5 a mounting mechanism that comprises a male section (adapter 501) and female section (comprising slide sleeve 502, latches 503-505, spring 506, and main body 507). As shown in FIG. 5, latch 503 comprises arm portion 503a and claw portion 503b. Embodiments may support different numbers of latches, for example 1, 2, 3, 4, or more.

Figure 6:
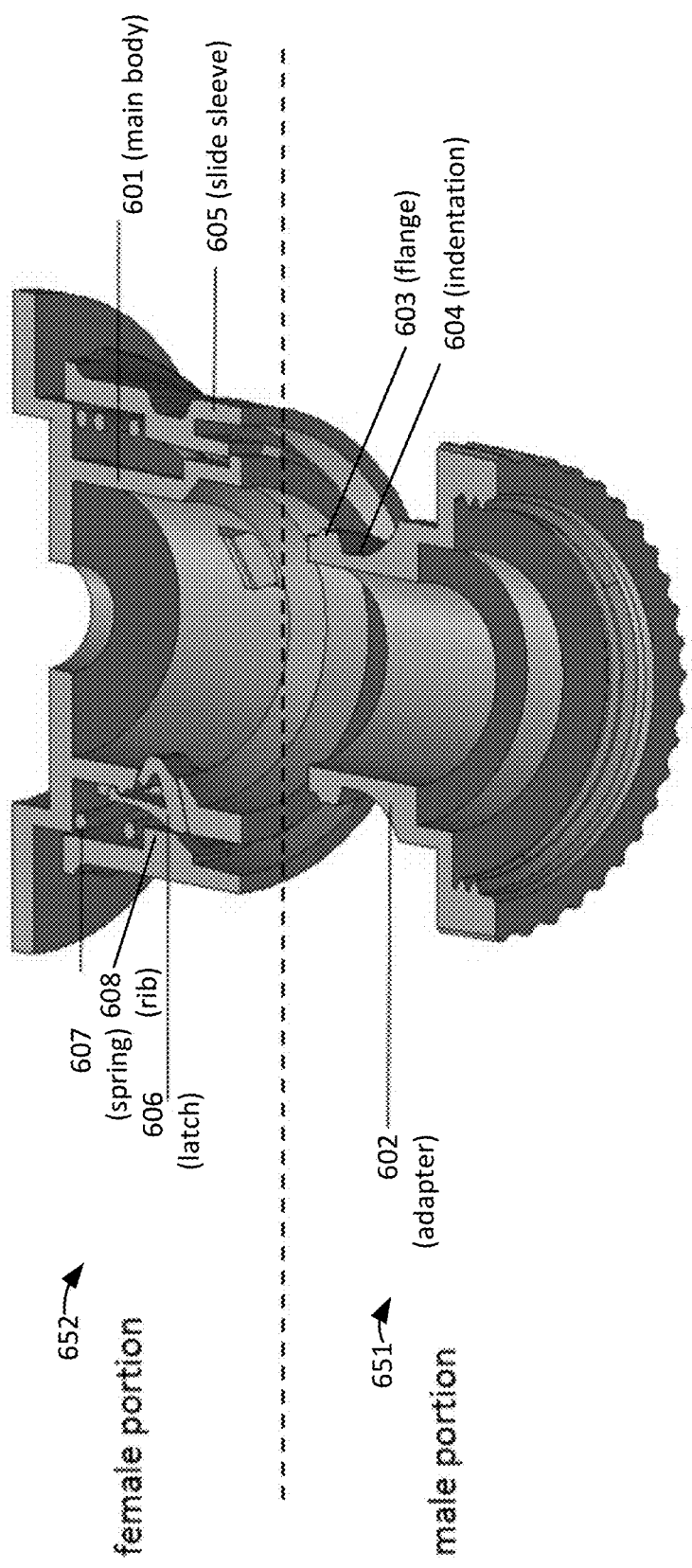
FIG. 6 shows a sectional view of a mounting mechanism in an unlocked state according to one or more aspects of the present disclosure.

FIG. 6 shows a sectional view of the mounting mechanism shown in FIG. 5 in an unlocked state.

As shown in FIG. 6, male section 651 is single part adaptor 602 having a lower end with threads. The threads may be manufactured with different dimensions to fit different types of valve and manifold. The adaptor is often small and can be easily grabbed by hand to mount quickly onto the valve or manifold by turning the threads. The upper end has flange 603 and indentation 604, which allows quick coupling to female section 651.

As shown in FIG. 6, female section 652 comprises main body 601, slide sleeve 605, one or more latches 606, and spring 607 (typically metal). Main body 601 may be a separate part assembly from a valve controller body or may be embedded as a section of a valve controller housing.

To engage female section 652 to male section 651, an installer can push up slide sleeve 605 and insert female section 652 to male section 651, then release slide sleeve 605. When slide sleeve 605 is in a release state, spring 607 pushes the slide sleeve 605 down. When slide sleeve 605 is at a lower position of main body 601, inner ribs 608 hold latches 606 in position. Latches 606 cannot move outward with ribs 608 supporting the back of latches 606, and consequently flange 603 of adaptor 602 is locked by latches 606. Female section 652 cannot be separated from male section 651 when in this state (designated as the locked state).

To remove female section 652 from male section 651, the installer pushes up slide sleeve 605 and pulls female section 652 from male section 651. When slide sleeve 605 is pushed to the upper position of main body 601, inner ribs 608 (that are inside slide sleeve 605 and behind latches 606) moves up and consequently creates a space behind latches 606. Latches 606 are then enabled to be pushed outward by flange 603 of adaptor 602. Female section 652 can then be separated from male section 651 when in this state (the release state).

FIG. 7 shows a sectional view of a mounting mechanism in a locked state according to one or more aspects of the present disclosure. As previously discussed, female section 652 cannot is separated from male section 651 when in the locked state. When in the locked state, latch 701 engages to indentation 702 and is maintained in this position by rib 703.

Aspects of the invention have been described in terms of illustrative embodiments thereof. Numerous other embodiments, modifications and variations within the scope and spirit of the disclosed invention will occur to persons of ordinary skill in the art from a review of this entire disclosure. For example, one of ordinary skill in the art will appreciate that the steps illustrated in the illustrative figures may be performed in other than the recited order, and that one or more steps illustrated may be optional in accordance with aspects of the disclosure.

We claim:

1. An apparatus for mounting a thermostatic device to a hydronic heating or cooling system, the apparatus comprising:
    a male section comprising a flange and an indentation around the male section below and along the flange, the male section having a threaded lower end and the flange located at an upper end, the male section configured to attach to a component of the hydronic heating or cooling system by threading the threaded lower end onto the component of the hydronic heating or cooling system; and
    a female section comprising a main body, a slide sleeve, and a latching mechanism, the female section configured to attach to the male section by the latching mechanism locking onto the indentation of the male section in a lock state when the slide sleeve is in a lower position along the main body, the latching mechanism releasing from the indentation of the male section in a release state when the slide sleeve is in an upper position along the main body, the female section configured to attach to the thermostatic device, wherein latching mechanism comprises at least one latch, wherein the at least one latch comprises an arm portion to move within the main body, and wherein the least one latch comprises a claw portion to lock onto the indentation of the male section, the at least one latch locking into the indentation when in the lock state.

2. The apparatus of claim 1, wherein the female section further comprises a retention mechanism that maintains the apparatus in the lock state by generating a downward force on the latching mechanism.

3. The apparatus of claim 2, wherein the retention mechanism comprises a spring located between the main body and the slide sleeve of the female section.

4. The apparatus of claim 1, wherein the slide sleeve of the female section comprises at least one rib, the at least one rib located inside the slide sleeve, the at least one rib holding the latching mechanism in place when the slide sleeve is in the lower position along the main body.

5. The apparatus of claim 1, wherein the thermostatic device is attached to an upper part of the female section.

6. The apparatus of claim 5, wherein the female section is glued to a bottom of the thermostatic device.

7. The apparatus of claim 5, wherein the female section is welded to a bottom of the thermostatic device.

8. The apparatus of claim 5, wherein the female section is attached to a bottom of the thermostatic device by at least one screw.

9. The apparatus of claim 5, wherein the female section is attached to a bottom of the thermostatic device by at least one latch.

10. The apparatus of claim 1, wherein the threaded lower end has threads of a size and a type to match the component of the hydronic heating or cooling system.

11. The apparatus of claim 1, wherein the thermostatic device comprises a thermostatic radiator valve (TRV) assembly.

12. The apparatus of claim 1, wherein the thermostatic device comprises an automatic temperature balanced actuator (ABA) assembly.

13. The apparatus of claim 1, wherein at least one of the female section and the male section is constructed from a polymer.

14. The apparatus of claim 1, wherein at least one of the female section and the male section is constructed from a metallic material.

15. A mounting device for mounting a thermostatic device to a hydronic heating or cooling system, the mounting device comprising:
    a male section comprising a flange and an indentation around the male section above the flange, the male section having the flange located at a lower end, the male section configured to attach to the thermostatic device; and
    a female section comprising a main body, a slide sleeve, a latching mechanism, and a threaded end, the female section configured to attach to a component of the hydronic heating or cooling system by threading the threaded end onto the component of the hydronic heating or cooling system, the female section configured to attach to the male section by the latching mechanism locking onto the indentation of the male section in a lock state when the slide sleeve is in an upper position along the main body, the latching mechanism releasing from the indentation of the male section in a release state when the slide sleeve is in a lower position along the main body, wherein latching mechanism comprises at least one latch, wherein the at least one latch comprises an arm portion to move within the main body, and wherein the least one latch comprises a claw portion to lock onto the indentation of the male section, the at least one latch locking into the indentation when in the lock state.

16. The mounting device of claim 15, wherein the female section further comprises a retention mechanism that maintains the mounting device in the lock state by applying an upward force on the latching mechanism.

17. A component mountable in a hydronic heating or cooling system, the component comprising:
    a device, wherein the device is configured to interconnect with another device over an Internet;
    a male section comprising a flange and an indentation around the male section below the flange, the male section having a threaded lower end and the flange located at an upper end, the male section configured to attach to a system component of the hydronic heating or cooling system by threading the threaded lower end onto the system component of the hydronic heating or cooling system; and
    a female section attached to the device, the female section comprising a main body, a slide sleeve, a latching mechanism, and a spring, the female section configured to attach to the male section by the latching mechanism locking onto the indentation of the male section in a lock state when the slide sleeve is in a lower position along the main body, the latching mechanism releasing from the indentation of the male section in a release state when the slide sleeve is in an upper position along the main body, the spring maintaining the lock state by generating a downward force on the latching mechanism, wherein latching mechanism comprises at least one latch, wherein the at least one latch comprises an arm portion to move within the main body, and wherein the least one latch comprises a claw portion to lock onto the indentation of the male section, the at least one latch locking into the indentation when in the lock state.

* * * * *